(12) United States Patent
Bharadwaj et al.

(10) Patent No.: US 11,246,115 B2
(45) Date of Patent: Feb. 8, 2022

(54) RESOURCE ALLOCATION WITH PACKET DELAY BUDGET CONSTRAINT

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Kapil Gulati, Hillsborough, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 16/849,514

(22) Filed: Apr. 15, 2020

(65) Prior Publication Data

US 2020/0351826 A1    Nov. 5, 2020

Related U.S. Application Data

(60) Provisional application No. 62/843,252, filed on May 3, 2019.

(51) Int. Cl.
*H04W 72/02* (2009.01)
*H04W 28/26* (2009.01)
*H04W 92/18* (2009.01)

(52) U.S. Cl.
CPC .......... *H04W 72/02* (2013.01); *H04W 28/26* (2013.01); *H04W 92/18* (2013.01)

(58) Field of Classification Search
CPC ....... H04W 72/02; H04W 4/46; H04W 28/26; H04W 4/70; H04W 92/18
See application file for complete search history.

(56) References Cited

U.S. PATENT DOCUMENTS

| 2020/0145798 | A1* | 5/2020 | Kim | H04L 5/0091 |
| 2020/0220694 | A1* | 7/2020 | Khoryaev | H04W 28/04 |
| 2020/0229171 | A1* | 7/2020 | Khoryaev | H04W 72/08 |
| 2021/0314821 | A1* | 10/2021 | Huang | H04W 72/0446 |

OTHER PUBLICATIONS

Vucadinovic et al.,., "3GPP C-V2X and IEEE 802.11p for V2V communications in highway platooning scenarios", Mar. 15, 2018 (Year: 2018).*

(Continued)

*Primary Examiner* — Jae Y Lee
*Assistant Examiner* — Aixa A Guadalupe Cruz
(74) *Attorney, Agent, or Firm* — Harrity & Harrity, LLP (57) ABSTRACT

Various aspects of the present disclosure generally relate to wireless communication. In some aspects, a user equipment (UE) may select a selection window after an arrival of a packet. The selection window may be selected based at least in part on a delay budget associated with the packet. The UE may determine, based at least in part on the selection window, a control exclusion zone value. The UE may perform, based at least in part on the control exclusion zone value, a resource selection associated with determining available resources for transmitting a set of transmissions associated with the packet. Numerous other aspects are provided.

30 Claims, 7 Drawing Sheets

(56) References Cited

OTHER PUBLICATIONS

Intel Corporation: "Sidelink Resource Allocation Design for NK V2X Communication", 3GPP TSG RAN WG1 Meeting #96bis, 3GPP Draft; R1-1904296 Intel—EV2X_SL_M2, 3rd Generation Partnership Project (3GPP), Mobile Competence Centre; 650, Route Des Lucioles; F-06921 Sophia-Antipolis Cedex; France, vol. RAN WG1, No. Xi 'an, China; Apr. 8, 2019-Apr. 12, 2019, Apr. 3, 2019 (Apr. 3, 2019), 15 Pages, XP051707175.

Intel Corporation: "Summary for AI 7.2.4.2.2 Mode-2 Resource Allocation", 3GPP TSG RAN WG1 Meeting 196bis , 3GPP Draft; R1-1905717—Summary of 5G V2X Mode 2 V2, 3rd Generation Partnership Project (3GPP), Mobile Competence Centre; 650, Route Des Lucioles; F-06921 Sophia-Antipolis Cedex; France, vol. RAN WG1, No. Xi 'an, China; Apr. 8, 2019-Apr. 12, 2019, Apr. 9, 2019 (Apr. 9, 2019), 21 Pages, XP051707775.

International Search Report and Written Opinion—PCT/US2020/028520—ISA/EPO—dated Aug. 4, 2020.

Qualcomm Incorporated: "Sidelink Resource Allocation Mechanism for NK V2X", 3GPP Draft, 3GPP TSG RAN WG1 Meeting #97, R1-1907271_Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Reno, USA May 13, 2019-May 17, 2019 May 4, 2019 (May 4, 2019), XP051709294, 16 Pages.

Qualcomm Incorporated: "Sidelink Resource Allocation Mechanism for NK V2X", 3GPP TSG RAN WG1 #96bis, 3GPP Draft; R1-1905009 Sidelink Resource Allocation Mechanism for NR V2X, 3rd Generation Partnership Project (3GPP), Mobile Competence Centre; 650, Route Des Lucioles; F-06921 Sophia-Antipolis Cedex, vol. RAN WG1, No. Xi 'an, China; Apr. 8, 2019-Apr. 12, 2019, Apr. 7, 2019 (Apr. 7, 2019), 11 Pages, XP051700124.

\* cited by examiner

RESOURCE ALLOCATION WITH PACKET DELAY BUDGET CONSTRAINT

CROSS-REFERENCE TO RELATED APPLICATION

This patent application claims priority to U.S. Provisional Patent Application No. 62/843,252, filed on May 3, 2019, entitled "RESOURCE ALLOCATION WITH PACKET DELAY BUDGET CONSTRAINT," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for resource allocation with packet delay budget (PDB) constraint.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting a selection window after an arrival of a packet, wherein the selection window is selected based at least in part on a delay budget associated with the packet; determining, based at least in part on the selection window, a control exclusion zone value; and performing, based at least in part on the control exclusion zone value, a resource selection associated with determining available resources for transmitting a set of transmissions associated with the packet.

In some aspects, a UE for wireless communication may include memory and one or more processors operatively coupled to the memory. The memory and the one or more processors may be configured to select a selection window after an arrival of a packet, wherein the selection window is selected based at least in part on a delay budget associated with the packet; determine, based at least in part on the selection window, a control exclusion zone value; and perform, based at least in part on the control exclusion zone value, a resource selection associated with determining available resources for transmitting a set of transmissions associated with the packet.

In some aspects, a non-transitory computer-readable medium may store one or more instructions for wireless communication. The one or more instructions, when executed by one or more processors of a UE, may cause the one or more processors to: select a selection window after an arrival of a packet, wherein the selection window is selected based at least in part on a delay budget associated with the packet; determine, based at least in part on the selection window, a control exclusion zone value; and perform, based at least in part on the control exclusion zone value, a resource selection associated with determining available resources for transmitting a set of transmissions associated with the packet.

In some aspects, an apparatus for wireless communication may include means for selecting a selection window after an arrival of a packet, wherein the selection window is selected based at least in part on a delay budget associated with the packet; means for determining, based at least in part on the selection window, a control exclusion zone value; and means for performing, based at least in part on the control exclusion zone value, a resource selection associated with determining available resources for transmitting a set of transmissions associated with the packet.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
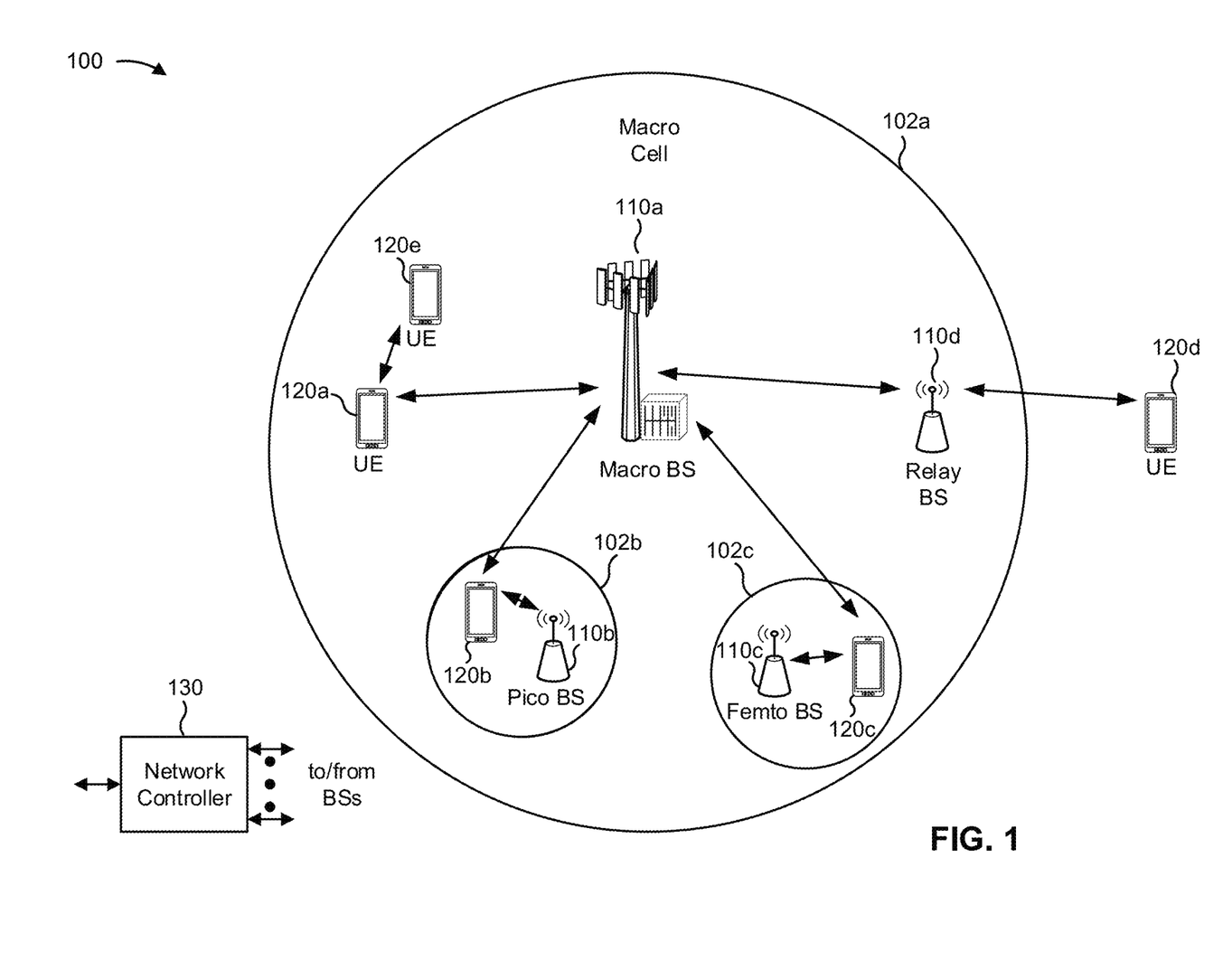
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, resource selection for sidelink communications among UEs 120 may be performed as described elsewhere herein in order to satisfy one or more delay budgets associated with a given packet. For example, as described below, UE 120 may select a selection window after an arrival of a packet, determine a CE zone value based at least in part on the selection window, and perform, based at least in part on the CE zone value, a resource selection associated with determining available resources for transmitting a set of transmissions associated with the packet.

As indicated above, FIG. 1 is provided as an example. Other examples may differ from what is described with regard to FIG. 1.

Figure 2:
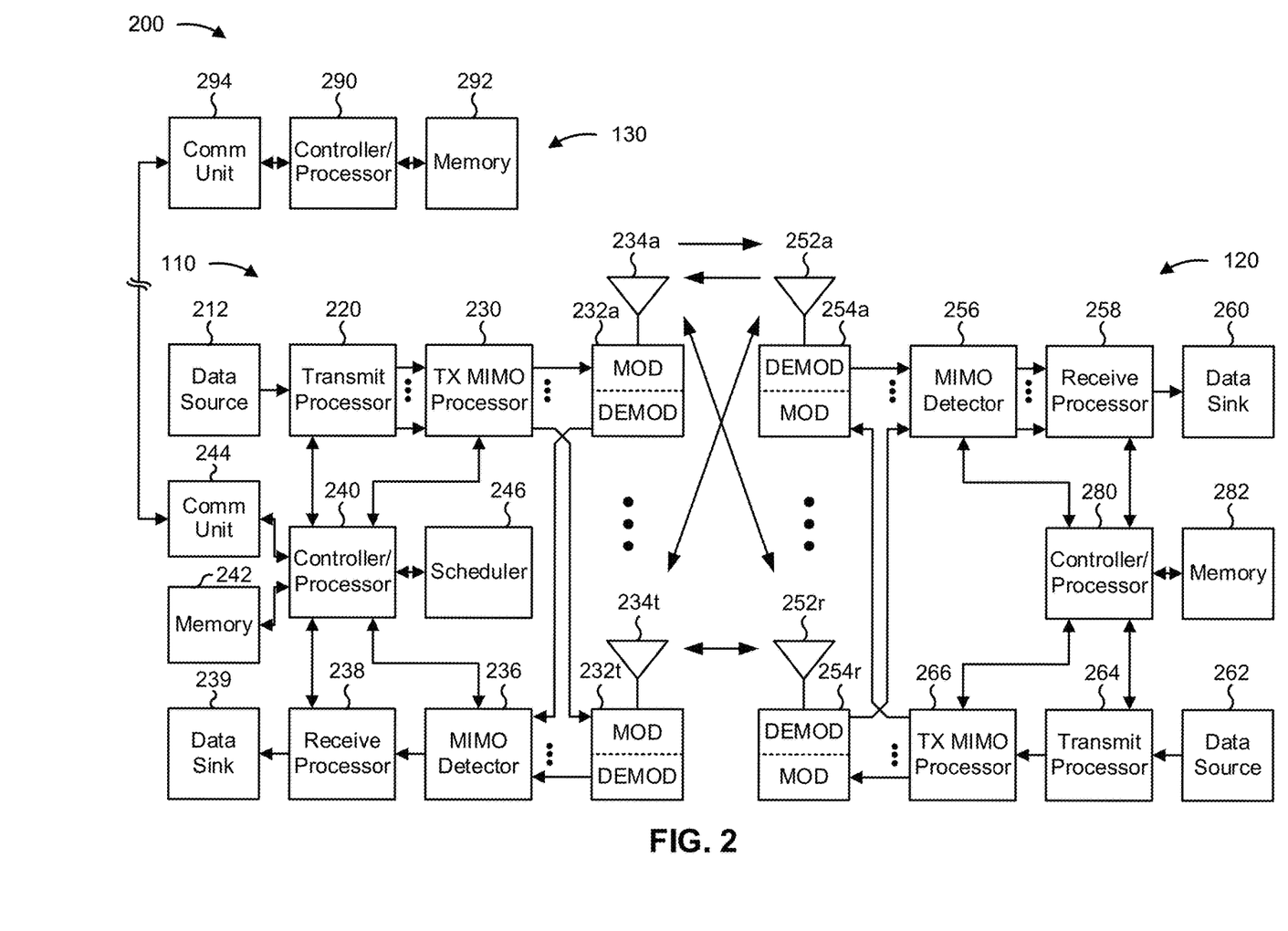
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resource allocation with packet delay budget (PDB) constraint, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for selecting a selection window after an arrival of a packet, wherein the selection window is selected based at least in part on a delay budget associated with the packet; means for determining, based at least in part on the selection window, a control exclusion zone value; means for performing, based at least in part on the control exclusion zone value, a resource selection associated with determining available resources for transmitting a set of transmissions associated with the packet; and/or the like. In some aspects, such means may include one or more components of UE 120 described in connection with FIG. 2

As indicated above, FIG. 2 is provided as an example. Other examples may differ from what is described with regard to FIG. 2.

In some communications systems, such as 5G or NR, UEs may communicate with other UEs using sidelink communications. For example, in an NR vehicle-to-everything (V2X) communications system, a first UE may transmit to a second UE, and the second UE may transmit to the first UE using a distributed channel access mechanism. In a distributed channel access mechanism, resource allocation needs to be performed without a central scheduling unit providing scheduling information. In other words, the UEs need to perform resource allocation amongst themselves (rather than resource allocation being performed by a network entity such as a base station).

A resource allocation mechanism for such a communications system should take into account delay budgets associated with a given packet, such as a packet delay budget (PDB) and a hybrid automatic repeat request (HARD) delay budget (HDB). A PDB is a constraint dictating a maximum delay between a time of packet arrival and a time of a last transmission of the packet. For example, each packet that arrives (i.e., at a transmitter of a UE for transmission by the transmitter) is associated with a PDB and a number of transmissions (i.e., a number of times that the packet is to be transmitted). The PDB and the number of transmissions can vary among packets depending on, for example, an application or service associated with the packet (e.g., in order to achieve a desired coverage or range). An HDB is a constraint dictating a maximum delay between a first transmission associated with the packet and a last transmission associated with the packet.

In some such communications systems that support UEs using sidelink communications (e.g., an NR V2X communications system), reservation-only transmissions (e.g., a transmission that includes a control channel only) and transmissions including multiple reservations (e.g., a transmission that includes multiple resource reservations associated with multiple future transmissions) may not be permitted. In such a case, a key constraint is that all transmissions associated with a packet should occur within a PDB. Additionally, all transmissions need to occur within the HDB. Current resource allocation mechanisms for such communications systems do not properly address these delay budget constraints.

Further, in a communications system such as an NR V2X communications system, a form of sensing can be used for resource selection and resource reservation. The purpose of this sensing is to detect occupied resources such that these occupied resources can be avoided during resource selection (e.g., in order to prevent collisions and/or improve reliability). Reliable estimation of occupied resources is possible through control channel decoding (e.g., due to the cyclic redundancy check (CRC)). Control channel information can be used to indicate to a UE occupied and reserved (time/frequency) resources, which can then be avoided by the UE when performing resource selection. Here, since the UE may be configured to continuously detect and decode all control channel transmissions, the UE may be aware of on-going transmissions, resources that have been reserved for future transmissions, a number of slots aggregated, allocated sub-band frequencies, or the like. Consequently, when a packet arrives and the UE needs to perform resource selection in association with sending a set of transmissions associated with the packet, occupied and/or reserved resources can be excluded from selection.

A UE may be configured to determine available resources based at least in part on control exclusion (CE) zones. A CE zone is defined as an area where a resource exclusion is applied, and occupied and/or reserved resources are avoided (e.g., such that the occupied and/or reserved resources are not selected for transmission). A given UE transmits CE zone information (e.g., information that defines the CE zone associated with the given UE) in a control channel (e.g., a physical sidelink control channel (PSCCH)) along with, for example, a resource reservation. A CE zone can be, for example, signal-based (e.g., based on a reference signal received power (RSRP) or the like), distance-based (e.g., based on a radial distance in, for example, meters), or path loss based. All UEs receiving the control channel may therefore decode the control channel in order to determine (and maintain) a resource allocation map based on resource reservations and indicated CE zones.

One issue with the use of CE zones is that if there many UEs reserving resources, the channel can become congested to a point that there are not enough resources available to use for a transmission. This can lead to significant delay, which may result in violation of a delay budget associated with a given packet. One possible solution to address such situations is to allow a UE to modify or scale a CE zone such that a CE zone that is indicated by another UE is altered in order to enable more resources to be deemed as available.

Some techniques and apparatuses described herein provide resource allocation with a PDB constraint. In some aspects, a UE may select a selection window after an arrival of a packet, the selection window being selected based at least in part on a delay budget associated with the packet (e.g., a PDB or an HDB). The UE may then determine a CE zone value based at least in part on the selection window. Here, the CE zone value may be determined based at least in part on the selection window. The UE may then perform, based at least in part on the CE zone value, a resource selection associated with determining available resources for transmitting a set of transmissions associated with the packet. Additional details are provided below.

FIGS. 3A-3D are diagrams illustrating an example 300 associated with resource allocation with packet delay budget (PDB) constraint, in accordance with various aspects of the present disclosure. In example 300, a UE (identified as UE0, which can be a UE 120) has received one or more respective control channel transmissions from each of a group of other UEs (identified as UE1, UE2, and UE3, each of which can be a UE 120). As described above, each control transmission may include information associated with a resource reservation for a respective UE, and information that defines a CE zone associated with the respective UE. For example, a control channel transmission received from UE1 may include information that identifies a set of resources reserved for a future transmission by UE1, as well as information that defines a CE zone associated with UE1 (identified as CE1) (e.g., a distance, a signal strength, or the like). As another example, a control channel transmission received from UE2 may include information that identifies a set of resources reserved for a future transmission by UE2, as well as information that defines a CE zone associated with UE2 (identified as CE2). As yet another example, a control channel transmission received from UE3 may include information that identifies a set of resources reserved for a future transmission by UE3, as well as information that defines a CE zone associated with UE3 (identified as CE3). The UE may receive multiple control channel transmissions from a given UE, each identifying a resource reservation and defining a CE zone.

Figure 3A:
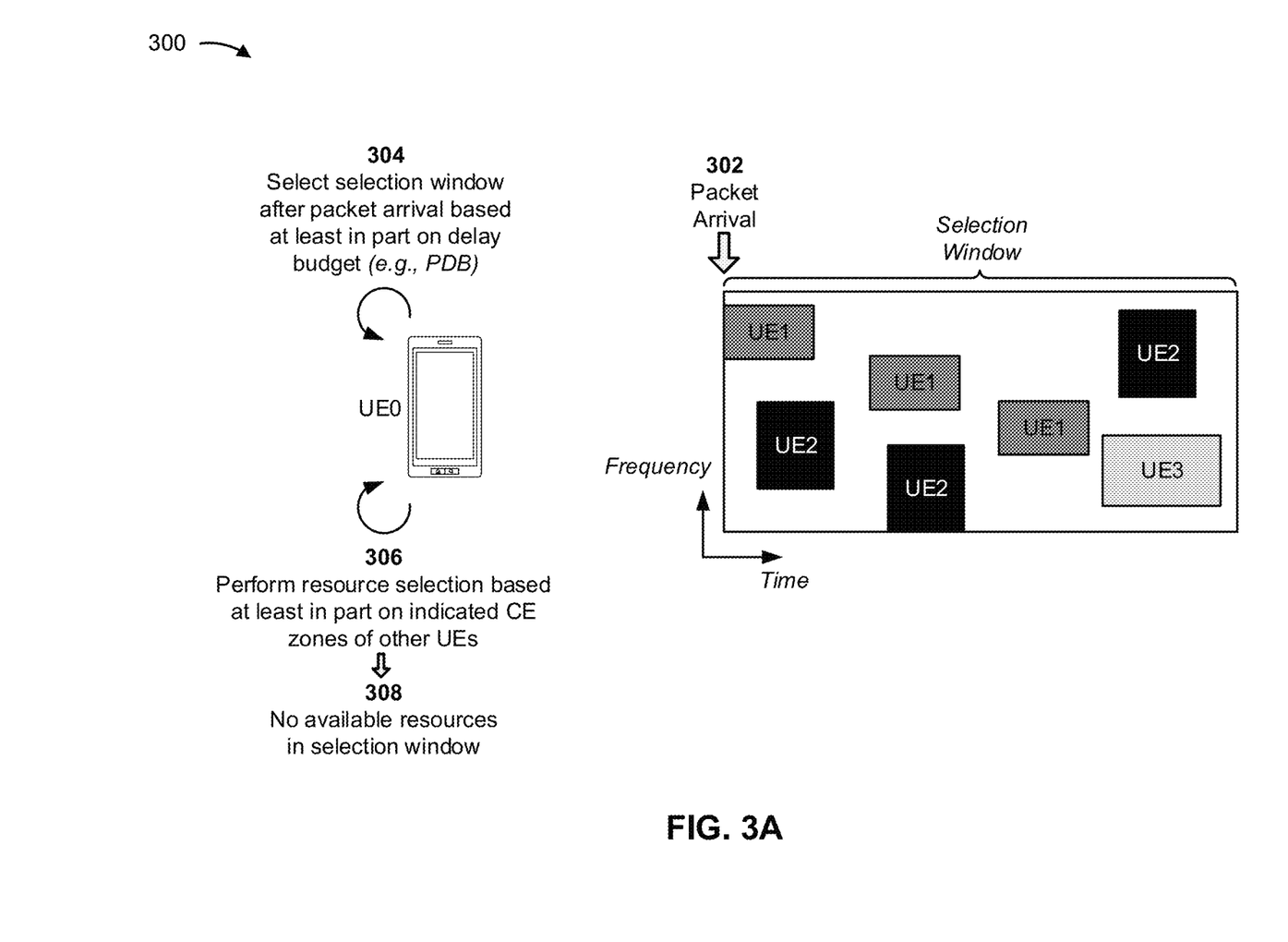
FIGS. 3A-3D are diagrams illustrating an example associated with resource allocation with packet delay budget (PDB) constraint, in accordance with various aspects of the present disclosure.

As shown in FIG. 3A, and by reference number 302, a packet may arrive at the UE (e.g., a data packet, including data from a data buffer, may arrive at a transmitter of the UE for transmission by the UE). In some aspects, as described above, the packet may be associated with a PDB and/or an HDB, and a number of transmissions N (i.e., a number of times that the packet is to be transmitted). In some aspects, the PDB, HDB, and/or the number of transmissions may depend on an application or a service associated with the packet (e.g., in order to achieve a desired coverage or reliability).

As shown by reference number 304, the UE may select a selection window (sometimes referred to as a contention window) after the arrival of the packet. In some aspects, the selection window may start upon arrival of the packet. In some aspects, the selection window may start after arrival of the packet (e.g., there may be a small delay between the time of packet arrival and the start of the selection window, such as a 1 to 4 slot delay). The selection window is a window interval in which the UE performs resource selection in association with identifying available resources for a set of transmissions associated with the packet.

In some aspects, the UE may select the selection window based at least in part on a delay budget associated with the packet. For example, as illustrated in FIG. 3A, the UE may select the selection window based at least in part on the PDB (e.g., a length of the selection window may match a length of the PDB). As another example, the UE may divide the smaller of the PDB and the HDB by a total number of transmissions N in the set of transmissions (CW=[min(PDB, HDB)/N]), a result of which is the selection window. Therefore, in some aspects, the UE may select the selection window based at least in part on the PDB (e.g., when the PDB is smaller than the HDB), while in other aspects, the UE may select the selection window based at least in part on the HDB (e.g., when the HDB is smaller than the PDB). As a particular example, if the PDB is 100 milliseconds (ms), the HDB is 32 ms, and the number of transmission is 4 (N=4), then the UE may select the selection window as 8 ms (e.g., since 100 ms>32 ms, and 32 ms/4=8 ms).

As an initial operation, in some aspects, as shown by reference number 306, the UE performs resource selection based at least in part on the selection window and the CE zones indicated by the other UEs. For example, illustrated by the right-hand portion of FIG. 3A, after the packet arrives and the UE selects the CW, the UE may determine, based at least in part on a resource map maintained by the UE (e.g., based at least in part on control channel transmissions received by the UE), whether there are available resources in the selection window. Here, the UE may determine whether the UE is within CE zones of the other UEs such that the UE should respect resource occupations and/or resource reservations of the other UEs.

Figure 3B:
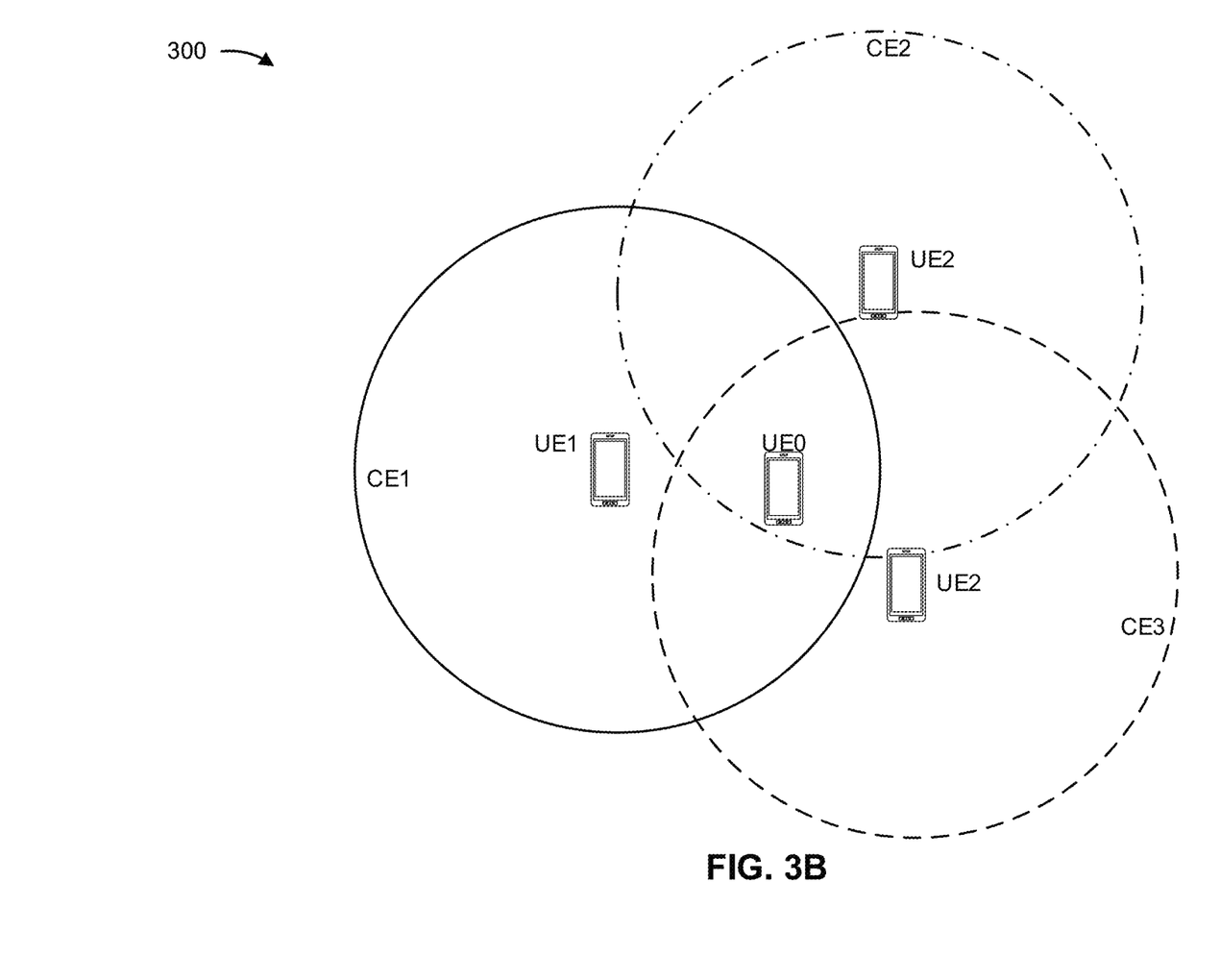

In example 300, and with reference to FIG. 3B, the UE determines that the UE is within CE1 associated with UE1, CE2 associated with UE2, and CE3 associated with UE3. As a simple example, each of CE1, CE2, and CE3 may be distance-based CE zones indicating a distance of 1000 meters (m). Here, the UE may determine that the UE is 700 m from UE1, 900 m from UE2, and 500 m from UE3. Therefore, the UE may determine that the UE is within CE1, CE2, and CE3 and, therefore, that the UE is to respect resource occupations and reservations associated with UE1, UE2, and UE3, respectively. As another example, each of CE1, CE2, and CE3 may be signal-based CE zones indicating a signal power of −3 dBm. Here, the UE may determine a UE1 reference signal received power of −1.5 dBM, a UE2 reference signal received power of −2.8 dBm, and a UE3 reference signal received power of −0.5 dBM. Therefore, the UE may determine that the UE is within CE1, CE2, and CE3 and, therefore, that the UE is to respect resource occupations and reservations associated with UE1, UE2, and UE3, respectively.

Returning to FIG. 3A, based at least in part on determining that the UE is within CE1, CE2, and CE3, the UE may attempt to determine a set of available resources in the control window. As illustrated by the right-hand portion of FIG. 3A, since the UE is within the CE zones associated with each of UE1, UE2, and UE3, the UE may respect resource occupations associated with UE1, UE2, and UE3 (e.g., such that resources being used or reserved for use by UE1, UE2, or UE3 are deemed unavailable). In this example, as shown by reference number 308, the UE may determine that no resources are available in the selection window.

In some aspects, the UE may scale a CE zone associated with one or more UEs based at least in part on a CE zone value. The CE zone value can be, for a example, a distance value (e.g., −100 m, when CE zones are distance-based), a signal strength value (e.g., −3 dBm, when CE zones are RSRP-based), or a path loss value. In some aspects, the UE may scale one or more CE zones based at least in part on determining that no resources are available in the upcoming selection window. Additionally, or alternatively, the UE may scale one or more CE zones without determining whether resources are available in the selection window (i.e., the UE may scale the CE zones before performing resource selection).

Figure 3C:
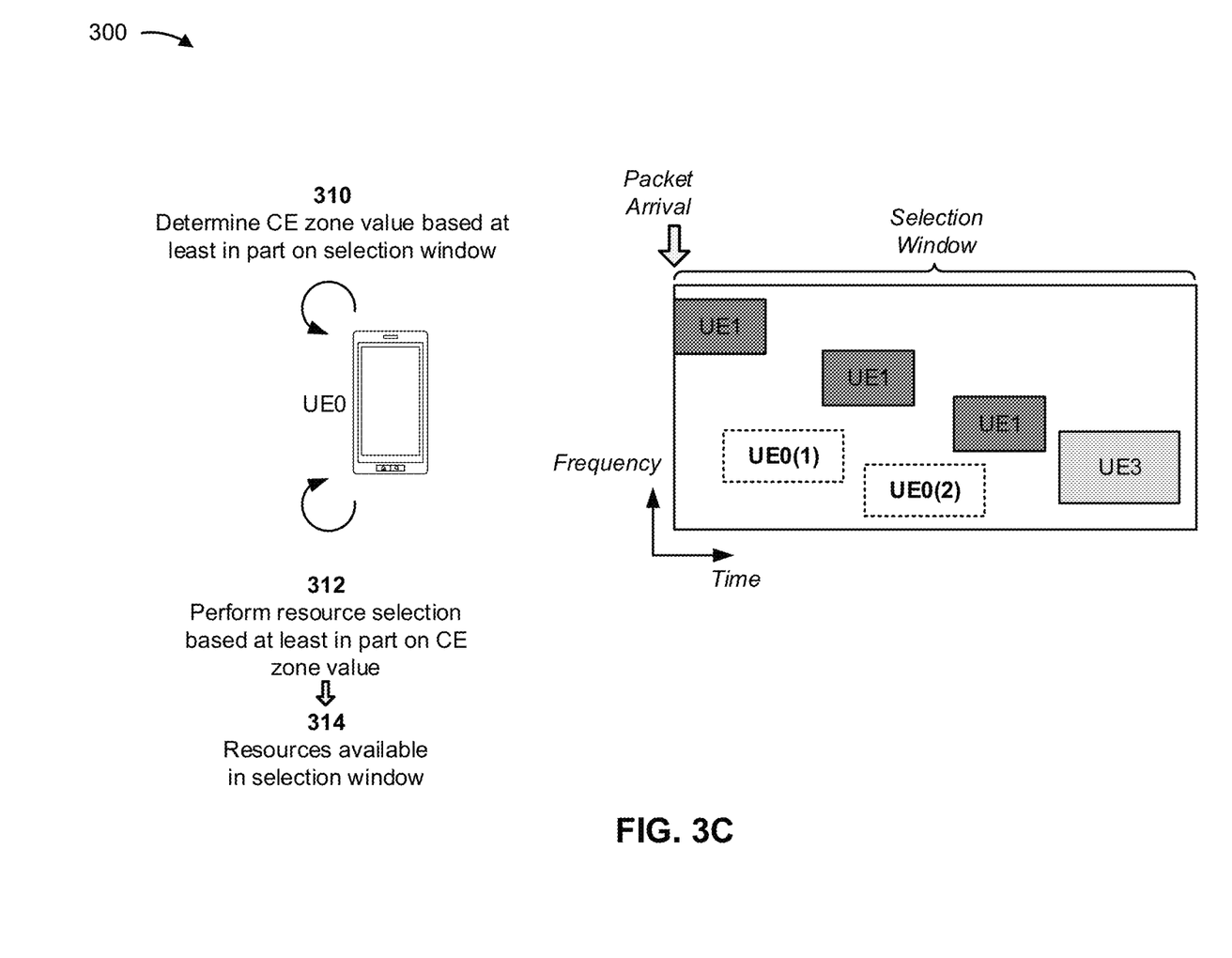

As shown by reference 310, the UE may determine a CE zone value based at least in part on the selection window. In some aspects, the UE may determine the CE zone value based at least in part on the selection window (e.g., the CE zone value may be a statistical metric that should result in available resources for an average selection window). In some aspects, the UE may determine the CE zone value based at least in part on the selection window and historical resource occupancy information. The historical resource occupancy information includes information that identifies occupied resources in a prior period of time (e.g., a most recent 1 second, a most recent 10 slots, or the like). In some aspects, the UE may determine the historical resource occupancy information based at least in part on information stored by the UE (e.g., the UE may continuously maintain resource occupancy information for the prior period of time).

In some aspects, the UE may determine the CE zone value by: (1) splitting the historical resource occupancy information based at least in part on the selection window to obtain a plurality of historical selection window intervals, (2) computing a plurality of resource occupancy ratios, each associated with a respective one of the plurality of historical selection window intervals, and (3) selecting the CE zone value based at least in part on the plurality of resource occupancy ratios. In some aspects, the UE may identify, based at least in part on the plurality of resource occupancy ratios, a set of congested intervals (e.g., the 50 most congested intervals) of the plurality of historical selection window intervals, and may select a CE zone value that results in a threshold percentage of resources being available in a threshold percentage of the set of congested intervals. For example, as indicated in FIG. 3C, the UE may select a CE zone value that results in at least X % (e.g., X=10, 25, or the like) of resources being available in Y % (e.g., Y=20, 40, or the like) of the set of congested intervals. In some aspects, the threshold percentage of available resources is based at least in part on a total number of transmissions associated with the packet. In other words, in some aspects, X may depend on the number of transmissions N associated with the packet (e.g., since a comparatively larger number of transmissions may require comparatively more resources to be available).

As shown by reference number 312, the UE may perform, based at least in part on the CE zone value, a resource selection associated with determining available resources for transmitting the set of transmissions associated with the packet. For example, as illustrated by the right-hand portion of FIG. 3C, after the UE determines the CE zone value, the UE may apply the CE zone value to the CE zones associated with UE1, UE2, and UE3. Here, the UE may determine, based at least in part on a resource map maintained by the UE and in accordance with the scaled CE zones, whether there are available resources in an upcoming selection window. In other words, the UE may determine whether the UE is within scaled CE zones of the other UEs such that the UE should respect resource occupations and/or resource reservations of the other UEs.

Figure 3D:
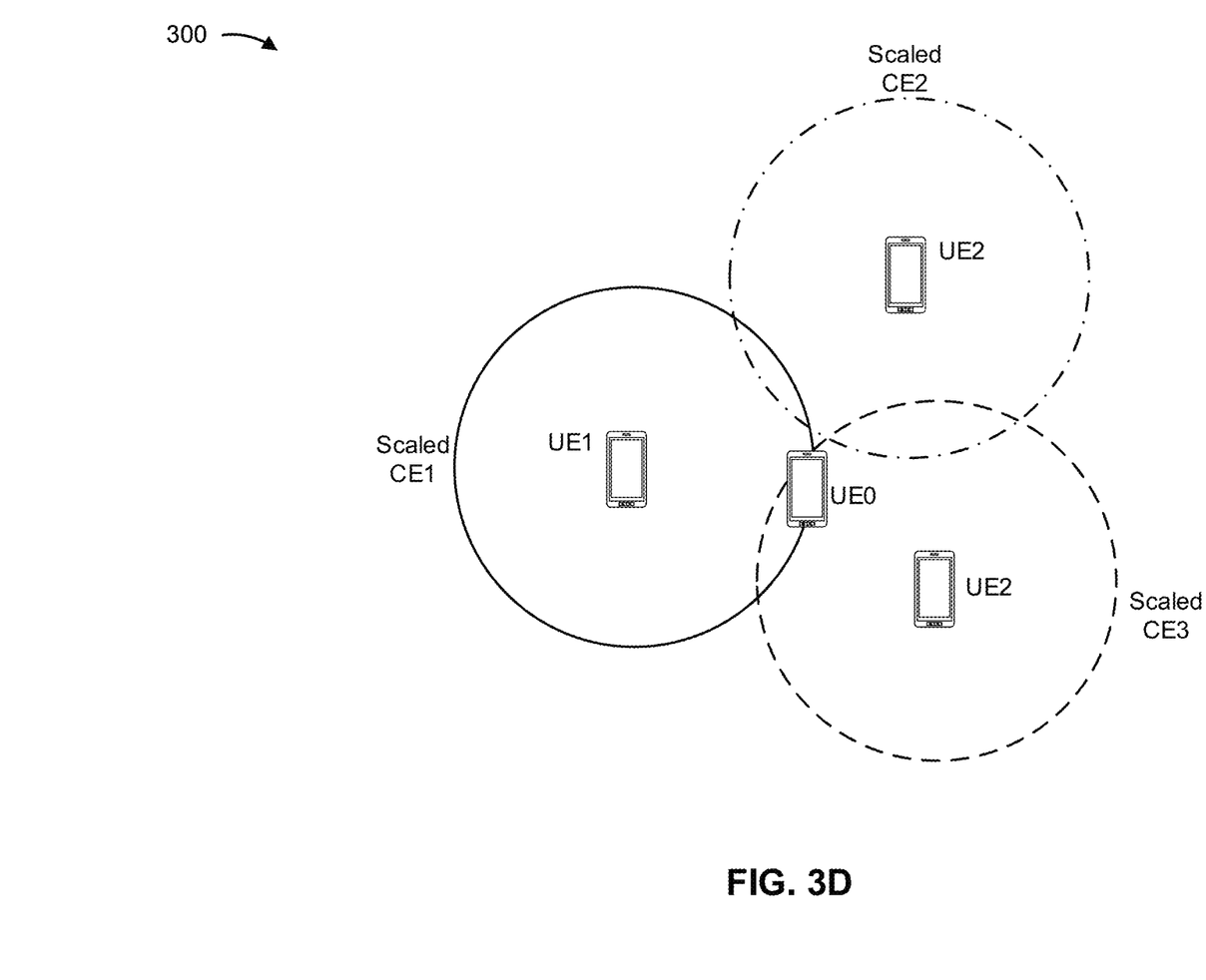

In this example, and with reference to FIG. 3D, the UE determines that the UE is within a scaled CE1 associated with UE1 and a scaled CE3 associated with UE3, but that the UE is not within a scaled CE2 associated with UE2. As a simple example, each of CE1, CE2, and CE3 may be distance-based CE zones indicating a distance of 1000 m, as described above. However, if the CE zone value determined by the UE indicates that the UE is to apply −125 m scaling, then the UE determines whether the UE is within 875 m of each of the other UEs (since 1000 m−125 m=875 m). As described above, the UE may determine that the UE is 700 m from UE1, 900 m from UE2, and 500 m from UE3. Therefore, the UE may determine that the UE is within scaled CE1 and scaled CE3, but that the UE is outside of scaled CE2. Therefore, the UE may determine that the UE is to respect resource occupations and reservations associated with UE1 and UE3, but may ignore resource occupations and reservations associated with UE2.

Returning to FIG. 3C, as shown by reference number 314, upon performing the resource selection, the UE may determine a first set of available resources (identified as UE0(1) in the right-hand portion of FIG. 3C) for a first transmission of the set of transmissions, and may determine a second set of available resources (identified as UE0(2) in the right-hand portion of FIG. 3C) for a second transmission of the set of transmissions. In some aspects, the first set of available resources and the second set of available resources may be included in the selection window. In this way, the UE may utilize scaling of CE zones to better enable completing transmissions associated with a given packet within a delay budget.

In some aspects, the UE may transmit the first transmission in the first set of available resources, the second set of available resources may be reserved based at least in part on control information (e.g., information in a PSCCH) included in the first transmission. Similarly, in some aspects, the UE may transmit the second transmission in the second set of available resources. In some aspects, a third set of available resources may be reserved based at least in part on control information included in the second transmission. In some aspects, the UE may perform another resource selection (e.g., as described above) at a time of the second transmission in order to determine the third set of available resources. In some aspects, the resource selection performed at the time of the second transmission is used to determine the third set of available resources only (e.g., at the time of a re-transmission, the above procedure may be repeated in order to identify a single set of resources rather than two sets of resources).

In some aspects, after performing the resource selection, the UE may determine that a particular set of available resources (e.g., the first set of resources and/or the second set of resources) is not available. For example, the UE may identify a set of available resources based at least in part on performing resource selection and, at a later time, may determine that the set of resources is not available (e.g., when the set of resources has been reserved by another UE or is currently being used by another UE). In such a case, the UE may perform a resource reevaluation (i.e., re-selection) based at least in part on determining that the particular set of available resources is not available. In some aspects, the UE may scale the CE zone value based at least in part on determining that the particular set of available resources is not available, and may perform the resource reevaluation based at least in part on the scaled CE zone value.

In some aspects, the UE may transmit the first transmission in the first set of available resources. If resource reevaluation is subsequently triggered (e.g., when the UE later determines that the second set of available resources is not available), then the UE may perform the resource reevaluation based at least in part on the HDB associated with the packet, rather than PDB (e.g., since an initial transmission was already completed).

In some aspects, when performing the resource selection (e.g., based at least in part on the CE zone value) the UE may determine that there is not an available set of resources in a first selection window, and may attempt to determine a set of available resources in a second selection window. In some aspects, the UE may repeat the process in additional selection windows until a threshold is satisfied (e.g., until a threshold percentage of a delay budget has lapsed, until the UE has swept a threshold number of selection windows, or the like).

In some aspects, when performing the resource selection (e.g., based at least in part on the CE zone value), the UE may determine that there is no available set of resources in a threshold number of selection windows, and the UE may scale the CE zone value based at least in part on determining that there is no set of available resources in the threshold number of selection windows. For example, the UE may scale the CE zone value (e.g., in the manner described above) in association with further modifying CE zones associated with other UEs. Here, after scaling the CE zone value, the UE may attempt to determine a set of available resources in one or more selection windows based at least in part on the scaled control exclusion zone value.

As indicated above, FIGS. 3A-3D are provided as examples. Other examples may differ from what is described with respect to FIGS. 3A-3D.

Figure 4:
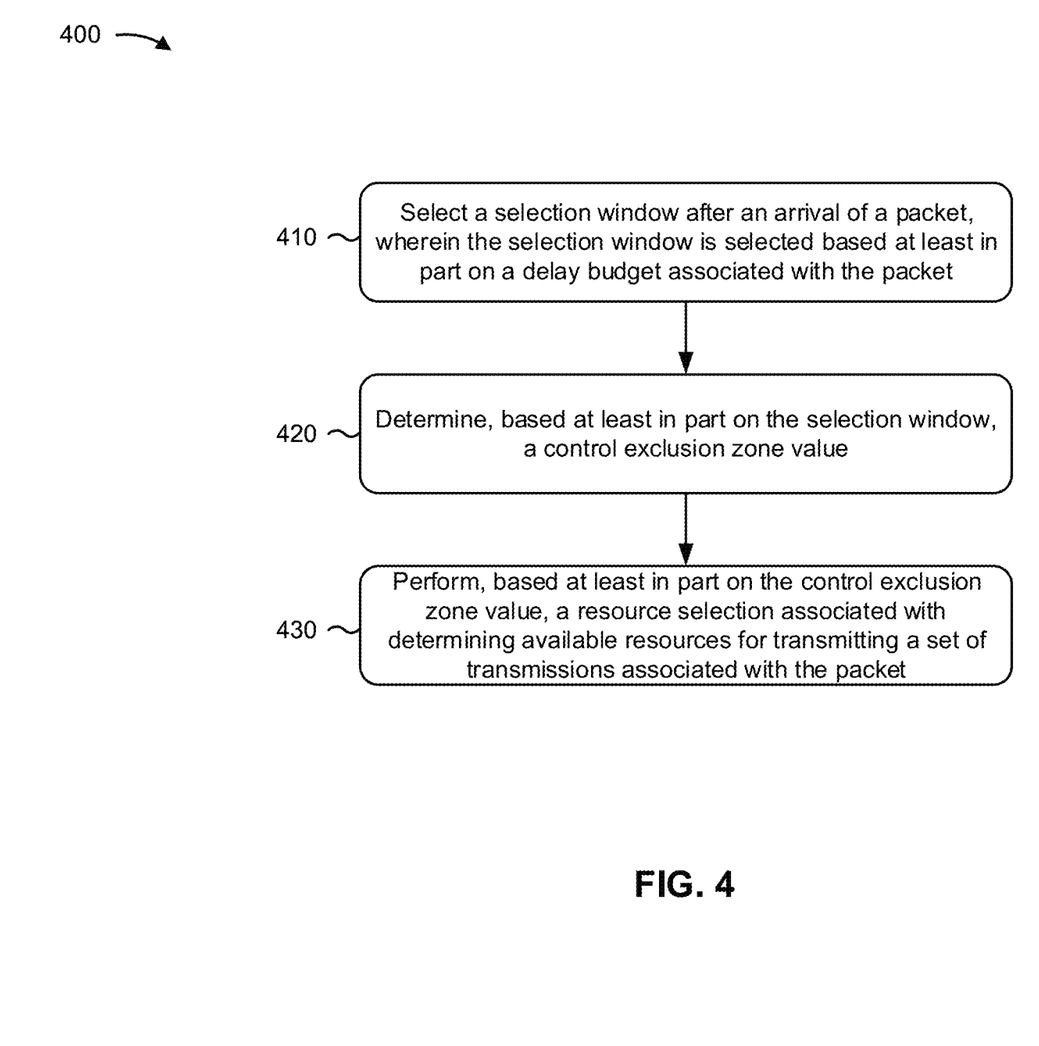
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with resource allocation with packet delay budget constraint.

As shown in FIG. 4, in some aspects, process 400 may include selecting a selection window after an arrival of a packet (block 410). For example, the UE (e.g., using receive processor 258, transmit processor 264, controller/processor 280, memory 282, and/or the like) may select a selection window after an arrival of a packet, as described above. In some aspects, the selection window is selected based at least in part on a delay budget associated with the packet.

As further shown in FIG. 4, in some aspects, process 400 may include determining, based at least in part on the selection window, a control exclusion zone value (block 420). For example, the UE (e.g., using receive processor 258, transmit processor 264, controller/processor 280, memory 282, and/or the like) may determine, based at least in part on the selection window, a control exclusion zone value, as described above.

As further shown in FIG. 4, in some aspects, process 400 may include performing, based at least in part on the control exclusion zone value, a resource selection associated with determining available resources for transmitting a set of transmissions associated with the packet (block 430). For example, the UE (e.g., using receive processor 258, transmit processor 264, controller/processor 280, memory 282, and/or the like) may perform, based at least in part on the control exclusion zone value, a resource selection associated with determining available resources for transmitting a set of transmissions associated with the packet, as described above.

Process 400 may include additional aspects, such as any single aspect or any combination of aspects described below and/or in connection with one or more other processes described elsewhere herein.

In a first aspect, the selection window is selected based at least in part on dividing the delay budget, associated with the packet, by a total number of transmissions in the set of transmissions.

In a second aspect, alone or in combination with the first aspect, the delay budget is a packet delay budget.

In a third aspect, alone or in combination with one or more of the first and second aspects, the delay budget is a hybrid automatic repeat request (HARQ) delay budget.

In a fourth aspect, alone or in combination with one or more of the first through third aspects, determining the control exclusion zone value comprises: splitting, based at least in part on the selection window, the historical resource occupancy information to obtain a plurality of historical selection window intervals; computing a plurality of resource occupancy ratios, each resource occupancy ratio of the plurality of resource occupancy ratios being associated with a respective one of the plurality of historical selection window intervals; and selecting the control exclusion zone value based at least in part on the plurality of resource occupancy ratios.

In a fifth aspect, alone or in combination with one or more of the first through fourth aspects, the UE may identify, based at least in part on the plurality of resource occupancy ratios, a set of congested intervals of the plurality of historical selection window intervals. Here, when selecting the control exclusion zone value, the UE may select the control exclusion zone value that results in a threshold percentage of resources being available in a threshold percentage of the set of congested intervals.

In a sixth aspect, alone or in combination with one or more of the first through fifth aspects, the threshold percentage of available resources is based at least in part on a total number of transmissions associated with the packet.

In a seventh aspect, alone or in combination with one or more of the first through sixth aspects, performing the resource selection comprises: determining a first set of available resources for a first transmission of the set of transmissions, and determining a second set of available resources for a second transmission of the set of transmissions.

In an eighth aspect, alone or in combination with one or more of the first through seventh aspects, the first set of available resources and the second set of available resources are included in the selection window.

In a ninth aspect, alone or in combination with one or more of the first through eighth aspects, the first set of available resources and the second set of available resources are included in different selection windows.

In a tenth aspect, alone or in combination with one or more of the first through ninth aspects, the first transmission is transmitted in the first set of available resources. Here, the second set of available resources is reserved based at least in part on control information included in the first transmission.

In an eleventh aspect, alone or in combination with one or more of the first through tenth aspects, the second transmission is transmitted in the second set of available resources. Here, a third set of available resources may be reserved based at least in part on control information included in the second transmission.

In a twelfth aspect, alone or in combination with one or more of the first through eleventh aspects, another resource selection is performed at a time of the second transmission in order to determine the third set of available resources. Here, the other resource selection performed at the time of the second transmission may be used to determine the third set of available resources only.

In a thirteenth aspect, alone or in combination with one or more of the first through twelfth aspects, the UE may determine, after performing the resource selection, that a particular set of available resources is not available. Here, the particular set of available resources includes the first set of available resources and/or the second set of available resources. The UE may perform a resource reevaluation based at least in part on determining that the particular set of available resources is not available.

In a fourteenth aspect, alone or in combination with one or more of the first through thirteenth aspects, the UE may scale the control exclusion zone value based at least in part on determining that the particular set of available resources is not available in one or more selection windows and, when performing the resource reevaluation, the UE may perform the resource reevaluation based at least in part on the scaled control exclusion zone value.

In a fifteenth aspect, alone or in combination with one or more of the first through fourteenth aspects, the first transmission is transmitted in the first set of available resources and, based at least in part on the first transmission being transmitted, a resource reevaluation is performed based at least in part on a hybrid automatic repeat request (HARM) delay budget associated with the packet.

In a sixteenth aspect, alone or in combination with one or more of the first through fifteenth aspects, performing the resource selection comprises: determining that there is not an available set of resources in a first selection window based at least in part on the control exclusion zone value; and attempting to determine a set of available resources in a second selection window based at least in part on the control exclusion zone value.

In a seventeenth aspect, alone or in combination with one or more of the first through sixteenth aspects, performing the resource selection comprises: determining that there is no available set of resources in a threshold number of selection windows based at least in part on the control exclusion zone value; scaling the control exclusion zone value based at least in part on determining that there is no set of available resources in the threshold number of selection windows; and attempting to determine a set of available resources in one or more selection windows based at least in part on the scaled control exclusion zone value.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting a selection window after an arrival of a packet, wherein the selection window is selected based at least in part on a delay budget associated with the packet;
    determining, based at least in part on the selection window, a control exclusion zone value; and
    performing, based at least in part on a control exclusion zone scaled based at least in part on the control exclusion zone value, a resource selection associated with determining available resources for transmitting a set of transmissions associated with the packet.

2. The method of claim 1, wherein the delay budget is a packet delay budget.

3. The method of claim 1, wherein performing the resource selection comprises:
    determining a first set of available resources for a first transmission of the set of transmissions, and
    determining a second set of available resources for a second transmission of the set of transmissions.

4. The method of claim 3, wherein the first set of available resources and the second set of available resources are included in the selection window.

5. The method of claim 3, wherein the first transmission is transmitted in the first set of available resources,
    wherein the second set of available resources is reserved based at least in part on control information included in the first transmission.

6. The method of claim 3, wherein the second transmission is transmitted in the second set of available resources,
    wherein a third set of available resources is reserved based at least in part on control information included in the second transmission.

7. The method of claim 6, wherein another resource selection is performed at a time of the second transmission in order to determine the third set of available resources,
    wherein the other resource selection performed at the time of the second transmission is used to determine the third set of available resources only.

8. The method of claim 3, further comprising:
    determining, after performing the resource selection, that a particular set of available resources is not available, wherein the particular set of available resources includes the first set of available resources or the second set of available resources; and
    performing a resource reevaluation based at least in part on determining that the particular set of available resources is not available.

9. The method of claim 8, further comprising:
    scaling the control exclusion zone value based at least in part on determining that the particular set of available resources is not available in one or more selection windows,
    wherein performing the resource reevaluation comprises:
        performing the resource reevaluation based at least in part on the scaled control exclusion zone value.

10. A user equipment (UE) for wireless communication, comprising:
    a memory; and
    one or more processors operatively coupled to the memory, the memory and the one or more processors configured to:
        select a selection window after an arrival of a packet, wherein the selection window is selected based at least in part on a delay budget associated with the packet;
        determine, based at least in part on the selection window, a control exclusion zone value; and
        perform, based at least in part on a control exclusion zone scaled based at least in part on the control exclusion zone value, a resource selection associated with determining available resources for transmitting a set of transmissions associated with the packet.

11. The UE of claim 10, wherein the delay budget is a packet delay budget.

12. The UE of claim 10, wherein the one or more processors, when performing the resource selection, are to:
    determine a first set of available resources for a first transmission of the set of transmissions, and
    determine a second set of available resources for a second transmission of the set of transmissions.

13. The UE of claim 12, wherein the first set of available resources and the second set of available resources are included in the selection window.

14. The UE of claim 12, wherein the first transmission is transmitted in the first set of available resources,
    wherein the second set of available resources is reserved based at least in part on control information included in the first transmission.

15. The UE of claim 12, wherein the second transmission is transmitted in the second set of available resources,
    wherein a third set of available resources is reserved based at least in part on control information included in the second transmission.

16. The UE of claim 15, wherein another resource selection is performed at a time of the second transmission in order to determine the third set of available resources,
    wherein the other resource selection performed at the time of the second transmission is used to determine the third set of available resources only.

17. The UE of claim 12, wherein the one or more processors are further to:
    determine, after performing the resource selection, that a particular set of available resources is not available, wherein the particular set of available resources includes the first set of available resources or the second set of available resources; and
    perform a resource reevaluation based at least in part on determining that the particular set of available resources is not available.

18. The UE of claim 17, wherein the one or more processors are further to:
    scale the control exclusion zone value based at least in part on determining that the particular set of available resources is not available in one or more selection windows,
    wherein the one or more processors, when performing the resource reevaluation, are to:
    perform the resource reevaluation based at least in part on the scaled control exclusion zone value.

19. A non-transitory computer-readable medium storing one or more instructions for wireless communication, the one or more instructions comprising:
    one or more instructions that, when executed by one or more processors of a user equipment (UE), cause the one or more processors to:
        select a selection window after an arrival of a packet, wherein the selection window is selected based at least in part on a delay budget associated with the packet;
        determine, based at least in part on the selection window, a control exclusion zone value; and perform, based at least in part on a control exclusion zone scaled based at least in part on the control exclusion zone value, a resource selection associated with determining available resources for transmitting a set of transmissions associated with the packet.

20. The non-transitory computer-readable medium of claim 19, wherein the delay budget is a packet delay budget.

21. The non-transitory computer-readable medium of claim 19, wherein the one or more instructions, when causing the one or more processors to perform the resource selection, cause the one or more processors to:
determine a first set of available resources for a first transmission of the set of transmissions, and
determine a second set of available resources for a second transmission of the set of transmissions.

22. The non-transitory computer-readable medium of claim 21, wherein the first set of available resources and the second set of available resources are included in the selection window.

23. The non-transitory computer-readable medium of claim 21, wherein the first transmission is transmitted in the first set of available resources,
wherein the second set of available resources is reserved based at least in part on control information included in the first transmission.

24. The non-transitory computer-readable medium of claim 21, wherein the second transmission is transmitted in the second set of available resources,
wherein a third set of available resources is reserved based at least in part on control information included in the second transmission.

25. The non-transitory computer-readable medium of claim 24, wherein another resource selection is performed at a time of the second transmission in order to determine the third set of available resources,
wherein the other resource selection performed at the time of the second transmission is used to determine the third set of available resources only.

26. The non-transitory computer-readable medium of claim 21, when executed by the one or more processors, further cause the one or more processors to:
determine, after performing the resource selection, that a particular set of available resources is not available,
wherein the particular set of available resources includes the first set of available resources or the second set of available resources; and
perform a resource reevaluation based at least in part on determining that the particular set of available resources is not available.

27. The non-transitory computer-readable medium of claim 26, when executed by the one or more processors, further cause the one or more processors to:
scale the control exclusion zone value based at least in part on determining that the particular set of available resources is not available in one or more selection windows,
wherein the one or more instructions, when causing the one or more processors to perform the resource reevaluation, cause the one or more processors to:
perform the resource reevaluation based at least in part on the scaled control exclusion zone value.

28. An apparatus for wireless communication, comprising:
means for selecting a selection window after an arrival of a packet,
wherein the selection window is selected based at least in part on a delay budget associated with the packet;
means for determining, based at least in part on the selection window, a control exclusion zone value; and
means for performing, based at least in part on a control exclusion zone scaled based at least in part on the control exclusion zone value, a resource selection associated with determining available resources for transmitting a set of transmissions associated with the packet.

29. The apparatus of claim 28, wherein the delay budget is a packet delay budget.

30. The apparatus of claim 28, wherein the means for performing the resource selection comprise:
means for determining a first set of available resources for a first transmission of the set of transmissions, and
means for determining a second set of available resources for a second transmission of the set of transmissions.

* * * * *